(12) United States Patent
Chanda et al.

(10) Patent No.: US 8,281,318 B2
(45) Date of Patent: Oct. 2, 2012

(54) SYSTEMS AND METHODS FOR INTER PROCESS COMMUNICATION BASED ON QUEUES

(75) Inventors: Anupam Chanda, Cupertino, CA (US); Kevin Scott Christopher, Palo Alto, CA (US); Jeremy Sugerman, Palo Alto, CA (US); Petr Vandrovec, Mountain View, CA (US); Gustav Seth Wibling, Aarthus (DK)

(73) Assignee: VMware, Inc., Palo Alto, CA (US)

( * ) Notice: Subject to any disclaimer, the term of this patent is extended or adjusted under 35 U.S.C. 154(b) by 1126 days.

(21) Appl. No.: 12/167,141

(22) Filed: Jul. 2, 2008

(65) Prior Publication Data

US 2009/0249357 A1 Oct. 1, 2009

Related U.S. Application Data

(60) Provisional application No. 61/041,140, filed on Mar. 31, 2008.

(51) Int. Cl.
*G06F 3/00* (2006.01)
(52) U.S. Cl. ........................ 719/314; 719/331
(58) Field of Classification Search .................. None
See application file for complete search history.

(56) References Cited

U.S. PATENT DOCUMENTS

| | | | |
|---|---|---|---|
| 6,854,115 B1 * | 2/2005 | Traversat et al. | 718/1 |
| 6,944,863 B1 * | 9/2005 | Ward et al. | 719/310 |
| 2003/0196010 A1 * | 10/2003 | Forin et al. | 710/52 |
| 2005/0268298 A1 * | 12/2005 | Hunt et al. | 718/1 |

OTHER PUBLICATIONS

George W. Dunlap, et al., "Execution Replay for Multiprocessor Virtual Machines," VEE'08, Seattle, Washington, USA, pp. 121-130, Mar. 2008.
Jeremy Sugerman, et al., "Virtualizing I/O Devices on VMware Workstation's Hosted Virtual Machine Monitor," USENIX Annual Technical Conference, Proceedings of USENIX 2001, Boston, MA, USA, Jun. 2001.
Min Xu, et al., "ReTrace: Collection Execution Trace with Virtual Machine Deterministic Replay," MOBS, San Diego, CA, USA, Jun. 2007.

\* cited by examiner

*Primary Examiner* — Lechi Truong
*Assistant Examiner* — Carina Yun

(57) ABSTRACT

A method of data communication between a first virtual machine and a second virtual machine is disclosed. The second virtual machine is executing in a record/replay mode. Data from the first virtual machine is copied to a first queue. The first queue receives the data from the first virtual machine. The first queue has a header section and a data section, wherein the header section being write protected and stores a tail pointer of the data in the first queue. The tail pointer is updated in the header section. This update of the tail pointer causes a page fault, which is handled-through a page fault handler. The handling includes copying the data from the first queue to a second queue. The second queue being configured to receive a copy of the data and to allow the second virtual machine to access the copy of the data.

17 Claims, 5 Drawing Sheets

SYSTEMS AND METHODS FOR INTER PROCESS COMMUNICATION BASED ON QUEUES

CROSS REFERENCE TO RELATED APPLICATION(S)

This application claims the benefit of U.S. Provisional Application No. 61/041,140, filed on Mar. 31, 2008.

BACKGROUND

Execution replay is a technique that enables reconstruction of a past execution of a system. In conjunction with a checkpoint of the system state, the execution replay provides the ability to reconstruct the entire state at any point in time over a replay interval. The execution replay has many important applications, including debugging, fault-tolerance, and security.

Sharing memory between processes (including virtual machines) on the same machine can be used to provide a fast communication path between the processes. However, to log data read from the shared memory, the shared memory is read protected during a record/replay mode execution of a virtual machine. Hence, every write or read of a shared memory region causes a page fault to enable logging of data through a page fault handler. Since most CPU instructions typically write data into a shared memory region in small denomination, this sharing of memory becomes prohibitively costly due to a large volume of page faults to exchange even a few mega bytes of data.

During a recording and a replaying of CPU instructions, a state of the execution events in the machine needs to managed and validated. This overhead of managing and validating the execution events causes the performance of the system to degrade. Also, the deterministic replay makes it necessary to ensure an ordering of dependent events under recording and replaying so that identical outputs are obtained from the machine or identical execution paths are followed by the machine at all execution branch points. This ordering mechanism causes further slow down of the deterministic replay process.

Thus, there is a need for methods and systems for a fast and replayable (i.e., capable of being efficiently replayed through execution replay techniques) inter process communication among various processes including virtual machines.

SUMMARY

In one embodiment, a method of data communication between a first virtual machine and a second virtual machine is disclosed. The second virtual machine is executing in a record/replay mode. The method includes copying data from the first virtual machine to a first queue. The first queue is configured to receive the data from the first virtual machine. The first queue has a first queue header section and a first queue data section. The first queue header is write protected and configured to store a tail pointer of the data in the first queue. The tail pointer is updated in the first header section. The second queue has a second queue header section which is read protected. This header section of the second queue contains a copy of the first queue header section's tail pointer. Inspection or update of this tail pointer by the second virtual machine causes a page fault. The method further includes handling page fault through a page fault handler. The handling includes copying the data from the first queue to the second queue. The second queue being configured to receive a copy of the data and to allow the second virtual machine to access the copy of the data.

In another embodiment, a method of setting up a data communication channel between a first virtual machine and a second virtual machine is disclosed. The second virtual machine is executing in a record/replay mode. The method includes creating a first queue to receive data from the first virtual machine. The first queue has a first header section and a first data section. The first header section is configured to store a tail pointer of the data. The method further includes creating a second queue to receive the data from the second virtual machine. The first queue receives copy of the data from the second queue. The head pointer stored in the second queue header section is write protected. Hence, any attempt to modify the second header section by the second virtual machine invokes a page fault. The page fault handler copies data and the header contents from the second queue to the first header. By this mechanism, data produced by the second virtual machine (that is under record/replay mode) is made available to the first virtual machine.

In yet another embodiment, a computer readable media for storing programming instructions for data communication between a first virtual machine and a second virtual machine is disclosed. The computer readable media includes programming instructions for copying data from the first virtual machine to a first queue. The first queue is configured to receive the data from the first virtual machine. The first queue has a first queue header section and a first queue data section. The first queue header is write protected and configured to store a tail pointer of the data in the first queue. Programming instructions for updating the tail pointer in the first header section are also included. The update of the tail pointer causes a page fault. The computer readable media further includes programming instructions for handling the page fault through a page fault handler. The handling includes copying the data from the first queue to a second queue. The second queue is configured to receive a copy of the data and to allow the second virtual machine to access the copy of the data. The second virtual machine is executing in a record/replay mode.

DETAILED DESCRIPTION

Methods and systems for providing a fast and replayable inter process communication among various processes are disclosed. Term "replayable", as described herein, means that the execution of a process can be recorded for an exact re-execution of the process at a later time using the log and state information recorded at a previous execution of the process in a record/replay mode. In one embodiment, the process is a virtual machine that executes in a virtualization environment. The process of record/replay in virtualization environments has been described in publications entitled "ReTrace: Collecting Execution Trace with Virtual Machine", authored by Xu, et al., published in June 2007 and "Execution Replay for Multiprocessor Virtual Machines" authored by Dunlop et. al, which are being incorporated herein in its entirety by reference.

Figure 1A:
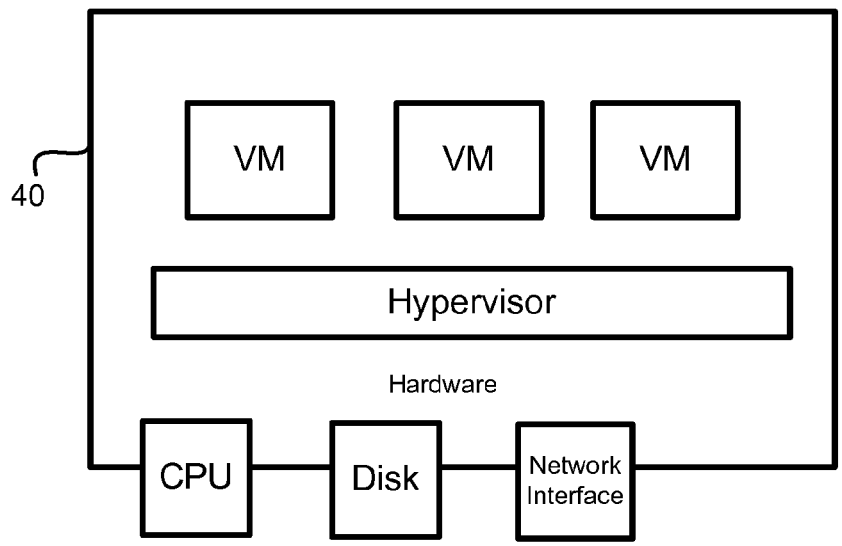
FIG. 1A illustrates an exemplary virtualization system, in accordance with one or more embodiments of the present invention.

FIG. 1 illustrates an exemplary virtualization system 40. The virtualization system includes one or more computers including CPUs, Disks, and network interfaces. A hypervisor is included to provide virtualization execution environment. One or more virtual machines execute in the hypervisor. The structure and functioning of a virtualization system are well known in the art; hence a detailed discussion is being omitted.

A fast communication path between processes in a system can be provided by sharing memory between the processes. A memory sharing between the processes (example, virtual machines) enables low latency and high bandwidth of physical memory devices, thereby, enhancing the speed of communication. The speed can be further enhanced by making the segment size of the data transfer between the processes relatively larger because the segment size of the data transfer can be as large as the maximum addressable region by the processes. Further, since the processor privilege level is not elevated in order to perform a shared memory transfer, the communication speed is further enhanced due to low access control overheads. The methods described herein can be applied to the shared memory communications between the processes executing on same as well as the processes executing on different virtual machines running on a single physical machine.

Figure 1B:
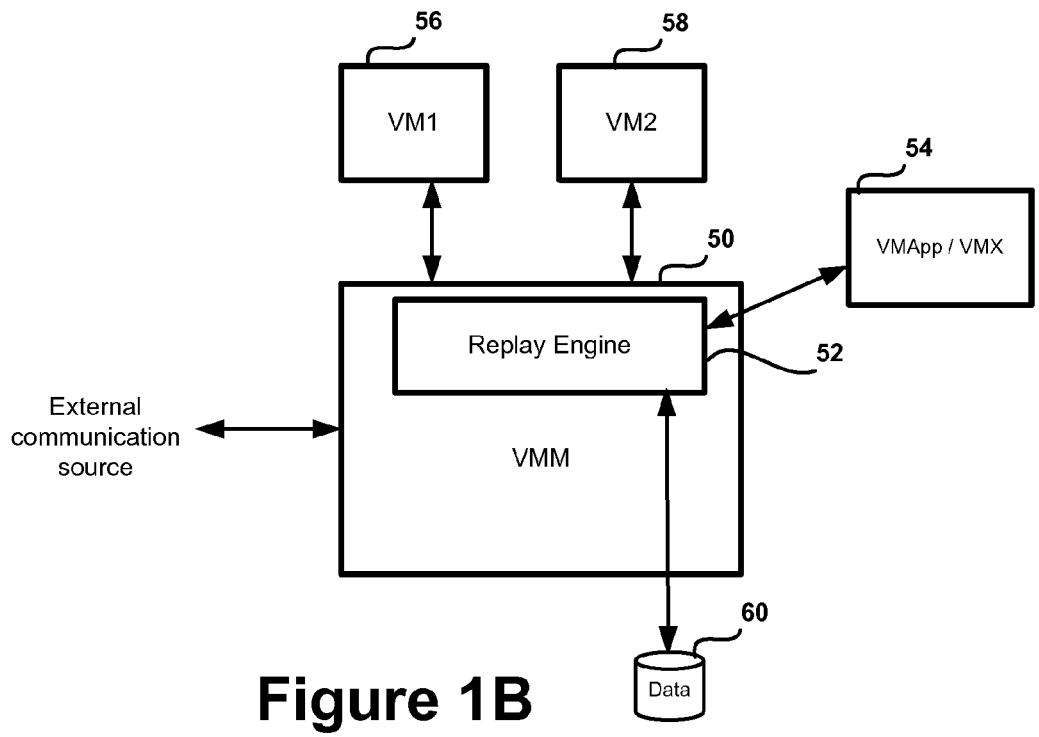
FIG. 1B illustrates an exemplary virtualization system including a replay engine, in accordance with one or more embodiments of the present invention.

FIG. 1B illustrates an exemplary virtualization system including a Virtual Machine Monitor (VMM) 50, a plurality of Virtual Machines (VM), VM1 56, VM2 58 and a VMApp/VMX 54 process in communication with VMM 50. The structure and functioning of VMM 50 is well known in the art, hence a detailed discussion is being omitted. "VMApp" or "VMX" 54 is a process that executes alongside VMM 50 and complements the functionality of replay engine 52. VMApp 54 has been described in publication titled "Virtualizing I/O Devices on VMware Workstation's Hosted Virtual Machine Monitor", authored by Jeremy Sugerman, Ganesh Venkitachalam and Beng-Hong Lim, which is incorporated herein by reference.

In a recording mode execution of a virtual machine, it is incumbent upon the virtualization system to record all incoming data including the time of arrival of each of the incoming data packets. The time of arrival, in one embodiment, is measured in terms of a number of executed instructions at the time of the arrival of the data from any external source. For example, when a packet is received from an external source, replay engine 52 stores the packet in the database or data store 60 along with the time of arrival. After logging this arrival event in a data store or a log file, the replay engine hands over the packet to a virtual machine that was the intended recipient of the packet. Replay engine 52 stores the recording data in a database or a data store. During a replay of the virtual machine execution, this logged data is used to recreate the incoming data from the external source at an identical point of execution as during recording.

Figure 2A:
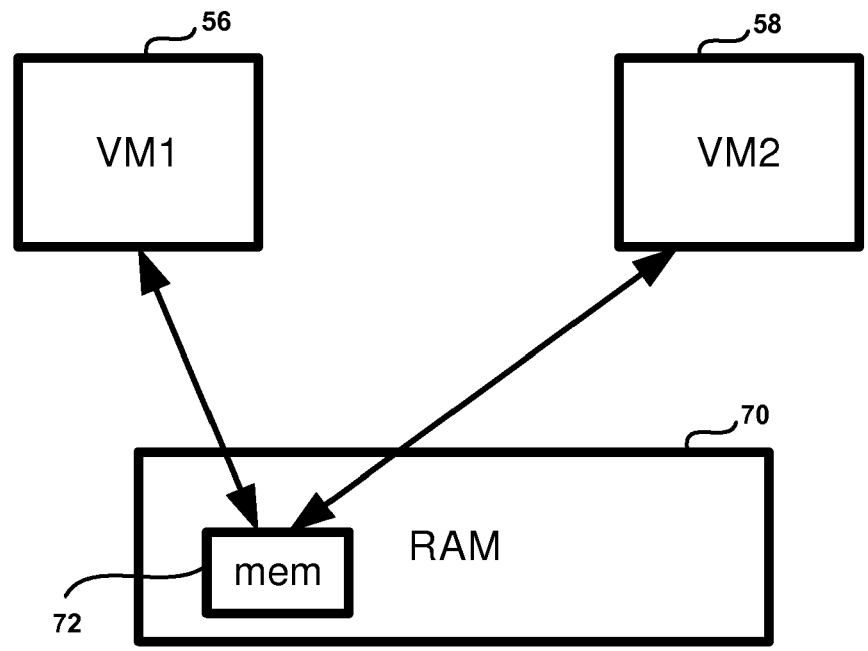
FIG. 2A illustrates a memory sharing between two virtual machines, in accordance with one or more embodiments of the present invention.

FIG. 2A illustrates shared main memory 70, which is being shared by two virtual machines 56, 58. Similar to recording of all incoming data from external sources to a virtual machine executing in a record/replay mode, inputs from a shared memory region 72 are also recorded for a CPU instruction level replay of the execution of the virtual machine. In one embodiment, the shared memory region is read/write protected to capture all inputs (or reads) from the shared memory region.

When data is read from the shared memory region 72, a page fault occurs. The read data is then stored in a record/replay log file and the control is handed over to the virtual machine that initiated the read operation. This way, the read data is recorded for a later replay of the virtual machine under a same simulated environment. The problem with this approach, however, is that the page fault handler needs to be called for a large number of times because the machine instructions generally read the data few bytes each time and every read operation would cause a page fault.

Figure 2B:
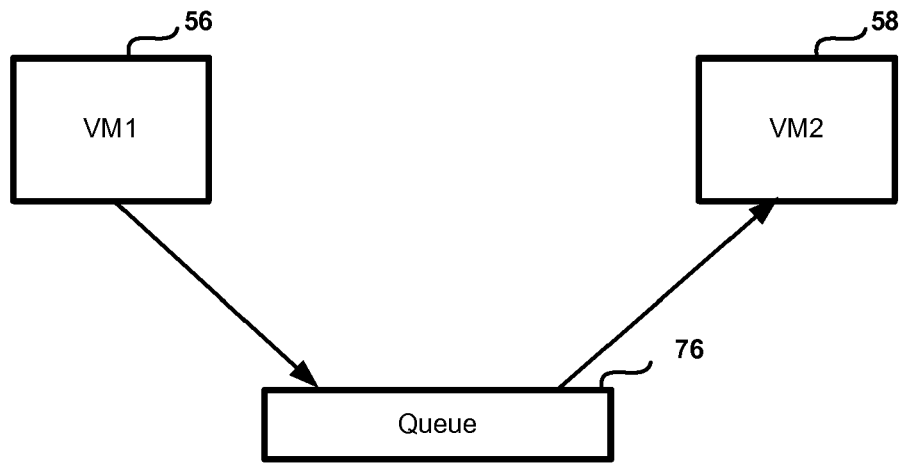
FIG. 2B illustrates a data transfer between two virtual machines using a queue, in accordance with one or more embodiments of the present invention.

FIG. 2B illustrate a data transfer between two virtual machines 56, 58. In this example, none of these two virtual machines are executing in a record/play mode. The data is transferred through a queue 76. In one embodiment, queue 76 is implemented in a shared memory region which is accessible to VM1 56 and VM2 58. In other embodiments, queue 76 may be implemented in any memory region so long as the queue 76 is accessible to both VM1 56 and VM2 58. Use of queue 76 enables a transparent data communication between VM1 and VM2 so that VM1 and VM2 don't need to access the shared memory directly.

Queue 76, in one embodiment, is a First In First Out (FIFO) queue that includes a header section and a data section. The header section provides storage for a head pointer and a tail pointer. The head pointer and the tail pointer are initialized to zero, in one embodiment. VM1 56 appends a block of data into the data section and updates the tail pointer. VM2 58 reads the data beginning from the head pointer and a memory location which is less than or equal to the memory address of the tail pointer. After reading a block of data from the data section, VM2 updates the head pointer to a new value. The data exchange from VM2 58 to VM1 56 also takes place in a similar manner.

Figure 3A:
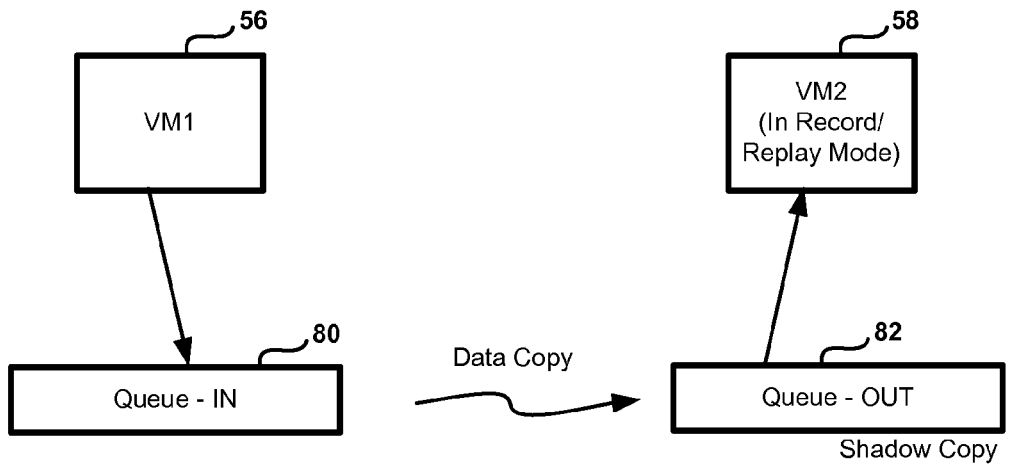
FIG. 3A illustrates an exemplary one way data transfer between two virtual machines, in accordance with one or more embodiments of the present invention.

FIG. 3A illustrates memory sharing between VM1 56 and VM2 58. In this example, VM2 58 is executing in record/replay mode. In order to execute VM2 in the replay mode (i.e., to simulate a previous execution of VM2), it is necessary to persistently log all incoming data (i.e., all non-deterministic inputs) during a previous execution of VM2. During replay at a later time, the data stored in the log is used to recreate the same operating environment as it existed during the previous execution of VM2.

In one embodiment, VM2 receives data from VM1 through a queue mechanism. IN queue 80 is created for receiving the data from VM1 and OUT queue 82 is a shadow copy of IN queue 80 to receive a copy of the data of IN queue 80. In one embodiment, these queues are created in the shared memory region. In another embodiment, these queues are created in a non shared memory region. Each of these queues 80, 82 includes a header section and a data section. These queues operate on a First In First Out (FIFO) scheme. The header section, in one embodiment, includes memory placeholders for storing at least one of a tail pointer and a head pointer. The tail pointer represents the ending memory address of the data in the data section in a queue. The head pointer, in one embodiment, represents the starting address of the unread data in a queue. In one embodiment, in queue 80, the head pointer is read protected and the tail pointer is write protected. Conversely, in queue 82, the head pointer is write protected and the tail pointer is read protected. Queues 80, 82 support two communication primitives, enqueue and dequeue. Both of these terms are well known in the art, hence any further explanation is being omitted.

In one embodiment, the tail pointer and the head pointer are initialized to an initial address. In one example, the tail pointer and the head pointer are initialized to a zero address. In another example, the tail pointer and the head pointer are initialized to the starting address of the data section of a queue. When VM1 seeks to send data to VM2, VM1 appends the data into the data section of IN queue 80. Since the data is appended, the ending address (i.e., the tail pointer) of the data in the data section of IN queue 80 needs to be updated in the header section of IN queue 80. Since the tail pointer is write protected, this update of the tail pointer triggers an exception, which is commonly referred to as a "page fault". The page fault is handled by a page fault handler module, which is programmed to copy the data in the data section of IN queue 80 to the data section of OUT queue 82. In one embodiment, the page fault handler is incorporated in VMApp/VMX. Further, the tail pointer and the head pointer are also copied from the header section of IN queue 80 to the header section of OUT queue 82.

Once the data is in the data section of OUT queue 82, the data is available to VM2. VM2 can read a specific amount of data starting from the memory address stored in the head pointer. This input data is stored in the record/replay log or data store for an execution simulation (i.e., CPU instruction replay) of VM2 at a later time. After a specific amount of data is read, the head pointer is updated to indicate a new memory address from which the next set of data should be fetched. In one embodiment, because the head pointer is write protected in OUT queue 82, a page fault occurs when the head pointer is updated after the read. A page fault handler is invoked to propagate the new head pointer to the header section of IN queue 80.

In another embodiment, the data in IN queue 80 can be copied to OUT queue 82 when VM2 attempts to read the data from OUT queue 82. Since the tail pointer in OUT queue 82 is read protected, a page fault is triggered when VM2 attempts to read the tail pointer in order to read the data from the data section of OUT queue 82. A page fault handler may be programmed to make a copy of the data from IN queue 80 to OUT queue 82 when this page fault occurs.

The amount of data that can be appended to IN queue 80 is configurable and/or programmable. Similarly, the amount of data that can be read from OUT queue 82 is also configurable and/or programmable. Hence, in one exemplary embodiment, if this size is 2 MB, there will be only one page fault for every 2 MB data written to IN queue 80. Relating back and comparing to the description of FIG. 2 in which the read/write protected shared memory was being written directly by the CPU instructions (which generally write only few bytes at a time), a large number of page faults can avoided by the use of one of more embodiments of the present invention.

Figure 3B:
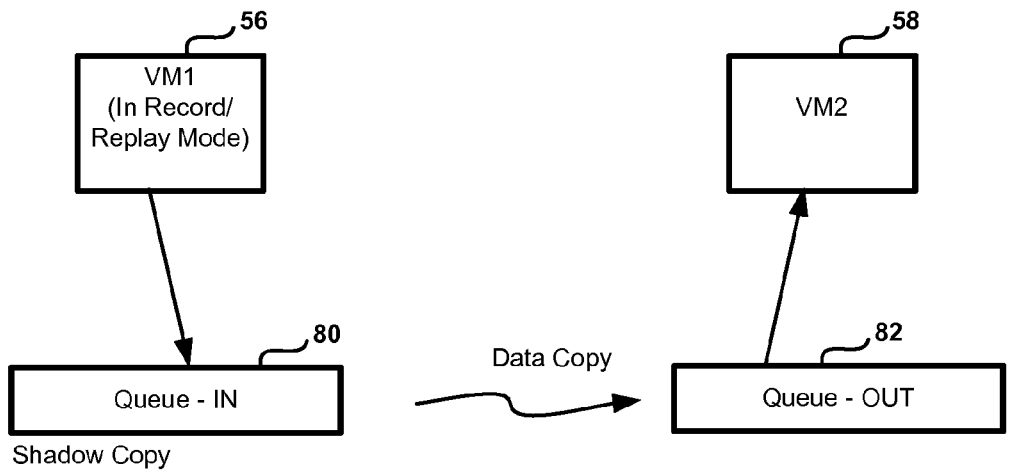
FIG. 3B illustrates another exemplary one way data transfer between two virtual machines, in accordance with one or more embodiments of the present invention.

FIG. 3B illustrates transferring of data from VM1 56 to VM2 58 in which VM1 is operating in record/replay mode. In one embodiment, IN queue 80 is a shadow copy of OUT queue 82. In one embodiment, the tail pointer of IN queue 80 and the head pointer of OUT queue 82 are write protected. Further, the head pointer of IN queue 80 and the tail pointer of OUT queue 82 are read protected. The data transfer from VM1 to VM2 takes place in the same manner as described in FIG. 3A.

Figure 3C:
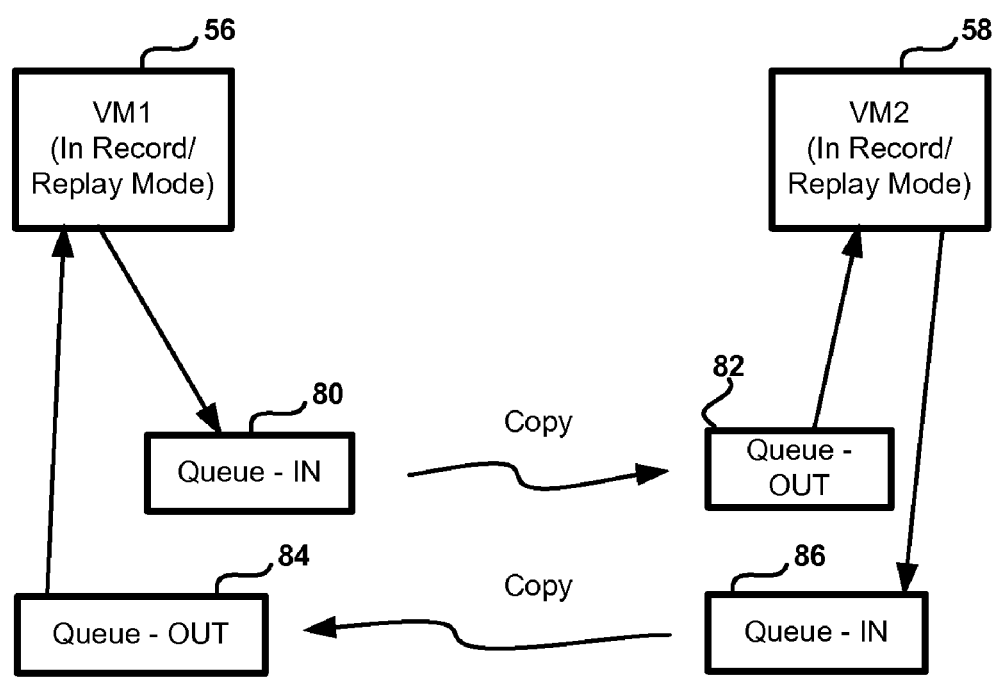
FIG. 3C illustrates an exemplary duplex data transfer between two virtual machines, in accordance with one or more embodiments of the present invention.

FIG. 3C illustrates an exemplary two way data transfer between VM1 and VM2. In this example, both VM1 56 and VM2 58 are executing in a record/replay mode. That is, all non-deterministic inputs need to be recorded for a later simulated execution. The data transfer from VM1 to VM2 via IN queue 80 and OUT queue 82 has already been described by FIG. 3A. The data transfer from VM2 to VM1 through IN queue 86, which is configured to receive data from VM2 58 and OUT queue 84, which supplies a copy of the data to VM1 56, is accomplished in the same manner as VM1 to VM2 data transfer, as described in FIG. 3B.

Figure 4:
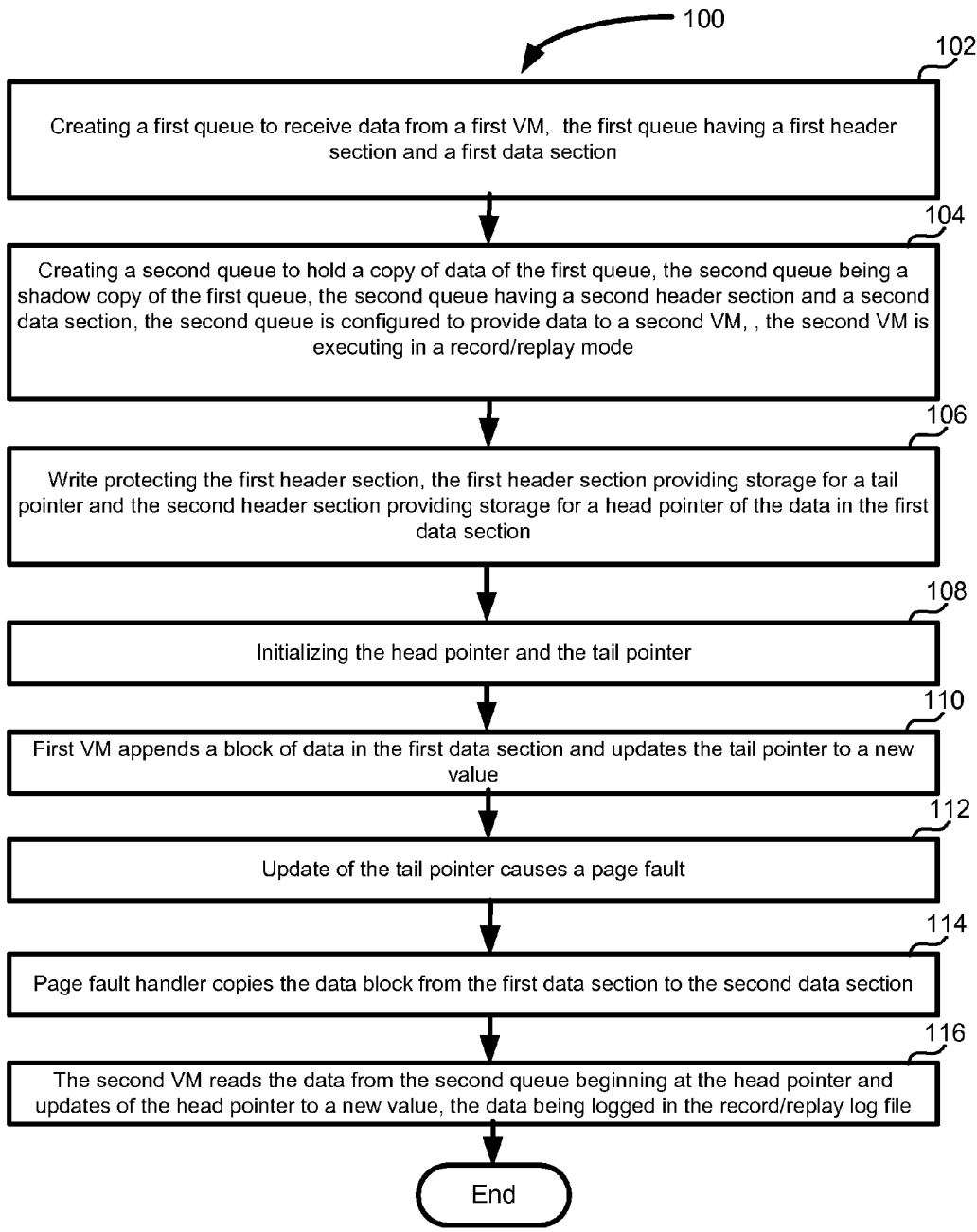
FIG. 4 illustrates a flow diagram of transferring data between two virtual machines, in accordance with one or more embodiments of the present invention.

FIG. 4 illustrates a method 100 of data transfer between two processes including Virtual Machines in a virtualized infrastructure, through queues to enable efficient recording of non-deterministic inputs to the processes. In operation 102, a first queue is created to receive data from a first VM. The first VM write data that need to be transferred to a second VM, into the first queue. Next, in operation 104, a second queue is created. In one embodiment, the first queue and the second queue can be created in a shared memory region or a non-shared memory region or in a combination thereof. The second queue is configured to receive and hold a copy of the data in the first queue. Both the first queue and the second queue have header sections and data sections. The header section provides storage for a head pointer and a tail pointer. The second VM is executing in a record/replay mode. Then, the control moves to operation 106 in which the tail pointer of the first queue is read protected and the head pointer is write protected. Conversely, the head pointer of the second queue is read protected and the tail pointer of the second queue is write protected. A tail pointer is a memory pointer that points to the end of the data in the queue. The head pointer is a memory pointer that points to the starting of the data block in a queue. A reader of a queue reads a block of data starting from the head pointer.

Next, in operation 108, the head pointer and the tail pointer are initialized to zero. In another embodiment, these pointers can be initialized to any other memory address that is within the addressing range of the virtual machines. In operation 110, the first VM appends a block of data in the data section of the first queue. The first queue and the second queue provide a First In First Out (FIFO) data input and output mechanism. Since the first queue now has additional data, the tail pointer is then updated. Further, because the tail pointer is stored in read/write protected memory area, in operation 112, the update of the tail pointer causes a page fault. Next, in operation 114, the page fault handler copies the data from the data section of the first queue to the data section of the second queue. The amount of data that can be appended at a time to the first queue is configurable. In one example, a 2 MB block of data may be appended. In another example, a 4 KB data block may be appended.

In one embodiment, if the space between the tail pointer and the end of the queue is not sufficient to accommodate a new block of data, the head pointer is initialized and the data is appended in the beginning of the queue data section. The tail pointer is then updated to refer to the end of the new block of data in the data section. In another embodiment, other queue memory management techniques may be employed so long as the incoming data can be stored in an addressable manner in the data sections of the queues.

Next, in operation 116, the second VM reads the data from the second queue. Subsequent to this read operation, the head pointer is updated. Next read operation then reads the data starting from the memory address referred to by the updated head pointer. The data along with the time of arrival of the data at the second VM is logged to enable replay of the second VM at a later time. As mentioned before, in one embodiment, the time may be measured in terms of number of executed CPU instructions at the time of reading of the data from the second queue. In another embodiment, the time can be measured in any other way so long as the method provides a way to recreate a simulated input of the data at comparatively same instance during a CPU instruction level replay as it was during a previous execution of the second VM.

The programming modules and ancillary software components, including configuration file or files, along with setup files required for providing inter process communication based on Queues and related functionality as described in this document, are stored on a computer readable medium. Any computer medium such as a flash drive, a CD-ROM disk, an optical disk, a floppy disk, a hard drive, a shared drive, and a storage suitable for providing downloads from connected computers, could be used for storing the programming modules and ancillary software components. It would be known to a person skilled in the art that any storage medium could be used for storing these software components so long as the storage medium can be read by a computer system.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of recording data communicated between a first virtual machine and a second virtual machine, the method comprising:

sending a configurable amount of data from the first virtual machine to a first queue, the first queue having a first header section and a first data section, the first header section configured to store a read-protected head pointer that represents a starting address of data in the first data section, the first header section further configured to store a write-protected tail pointer that represents an ending address of the data in the first data section;

appending the first data section with the sent data;

updating the write-protected tail pointer in the first header section to represent an updated ending address of the data in the first data section with an addition of the appended data;

receiving a page fault from updating the write-protected tail pointer; and handling the page fault by recording the data to a log file and copying the data from the first queue to a second queue, the second queue being a shadow copy of the first queue, and enabling the second virtual machine to access the copy of the data in the second queue.

2. The method as recited in claim 1, wherein the second queue includes a second header section, the second header section configured to store a write-protected head pointer, the write-protected head pointer configured to store a next read starting address in the copy of the data in the second queue, wherein the second virtual machine updates the write-protected head pointer after reading the copy of the data from the second queue.

3. The method as recited in claim 2, further comprising:
receiving a second page fault based on updating the write-protected head pointer; and
updating the read-protected head pointer in the first queue based on receiving the second page fault.

4. The method as recited in claim 1, wherein the first queue and the second queue are created in a shared memory region.

5. A non-transitory computer readable media for storing programming instructions for data communication between a first virtual machine and a second virtual machine, the non-transitory computer readable media causing one or more processors to perform the steps of:
sending a configurable amount of data from the first virtual machine to a first queue, the first queue having a first queue header section and a first queue data section, the first queue header section configured to store a read-protected head pointer that represents a starting address of data in the first queue data section, the first queue header section further configured to store a write-protected tail pointer that represents an ending address of the data in the first queue data section;
appending the first queue data section with the sent data;
updating the write-protected tail pointer in the first queue header section to represent an updated ending address of the data in the first data section with an addition of the appended data;
receiving a page fault from updating the write-protected tail pointer; and
handling the page fault by recording the data to a log file and copying the data from the first queue to a second queue, the second queue being a shadow copy of the first queue, the second queue being configured to allow the second virtual machine to access the copy of the data from the second.

6. The non-transitory computer readable media as recited in claim 5, further causing one or more processors to perform the steps of:
creating a second header section in the second queue; and
configuring the second header section to store a write-protected head pointer.

7. The non-transitory computer readable media as recited in claim 6, further causing one or more processors to perform the step of configuring the write-protected head pointer to store a next read starting address in the copy of the data.

8. The non-transitory computer readable media as recited in claim 6, further causing one or more processors to perform the step of updating the write-protected head pointer after reading the copy of the data from the second queue.

9. The non-transitory computer readable media as recited in claim 8, wherein an update of the write-protected head pointer by the second virtual machine causes a second page fault.

10. A method of setting up a data communication channel between a first virtual machine and a second virtual machine, the method comprising:
creating a first queue for receiving a configurable amount of data from the first virtual machine, the first queue having a first header section and a first data section, the first header section configured to store a read-protected head pointer that represents a starting address of data in the first data section, the first header section further configured to store a write-protected tail pointer that represents an ending address of the data in the first data section;
creating a second queue to receive a copy of the data from the first queue, the second queue being a shadow copy of the first queue, the second queue having a second header section and a second data section, the second header section being configured to store a write-protected head pointer of the copy of the data in the second data section, the write-protected head pointer configured to store a next read starting address in the copy of the data;
receiving a page fault when the first virtual machine appends the sent data to the first data section and updates the write-protected tail pointer in the first header section to represent an updated ending address of the data in the first data section with an addition of the appended data; and
handling the page fault by recording the data to a log file and copying the data from the first queue to the second queue.

11. The method as recited in claim 10, wherein the second header section is further configured to store a read-protected tail pointer that represents an ending address of the copy of the data in the second data section.

12. The method as recited in claim 11, wherein handling the page fault further includes copying the read-protected head pointer from the first header section to the second header section and copying the write-protected tail pointer from the first header section to the second header section.

13. A method of data communication between a first virtual machine and a second virtual machine, the method comprising:
creating a first queue that is accessible to the first virtual machine, the first queue having a first queue header section and a first queue data section, the first queue header section configured to store a read-protected head pointer that represents a starting address of data in the first data section, the first header section further configured to store a write-protected tail pointer that represents an ending address of the data in the first data section;
creating a shadow copy of the first queue, the shadow copy being configured to receive data from the first queue and configured to be accessible to the second virtual machine;
sending a configurable amount of data from the first virtual machine to the first queue;
appending the first data section with the sent data;
updating the write-protected tail pointer in the first queue header section to represent an updated ending address of the data in the first data section with an addition of the appended data;
receiving a page fault from updating the write-protected tail pointer; and
handling the page fault by recording the data to a log file and copying the data from the first queue to the shadow copy.

14. The method as recited in claim 13, wherein the shadow copy includes a second header section, the second header section configured to store a write-protected head pointer, the write-protected head pointer configured to store a next read starting address in the copy of the data in the second queue, wherein the second virtual machine updates the write-protected head pointer after reading the copied data from the second queue.

15. The method as recited in claim 14, further comprising:
receiving a second page fault based on updating the write-protected head pointer; and
updating the read-protected head pointer in the first queue based on receiving the second page fault.

16. The method as recited in claim 13, wherein the first queue and the second queue are created in a shared memory region.

17. A system for recording data communicated between virtual machines, the system comprising:
a first virtual machine;
a second virtual machine;
a memory area comprising:
a first queue communicatively coupled to the first virtual machine, the first queue comprising a first header section and a first data section, the first header section configured to store a read-protected head pointer that represents a starting address of data in the first data section, the first header section further configured to store a write-protected tail pointer that represents an ending address of the data in the first data section; and
a second queue communicatively coupled to the first queue and the second virtual machine, the second queue comprising a second header section and a second data section, the second header section configured to store a head pointer that represents a starting address of data in the second data section, the second header section further configured to store a tail pointer that represents an ending address of the data in the second data section; and
at least one processor programmed to:
send a configurable amount of data from the first virtual machine to the first queue;
append the first data section of the first queue with the sent data;
update the write-protected tail pointer in the first header section of the first queue to represent an updated ending address of the data in the first data section with an addition of the appended data;
receive a page fault from updating the write-protected tail pointer; and
handle the page fault by recording the data to a log file and sending a copy of the data in the first data section of the first queue to the second data section of the second queue, and enabling the second virtual machine to access the copy of the data in the second queue.

* * * * *